Figure 1:
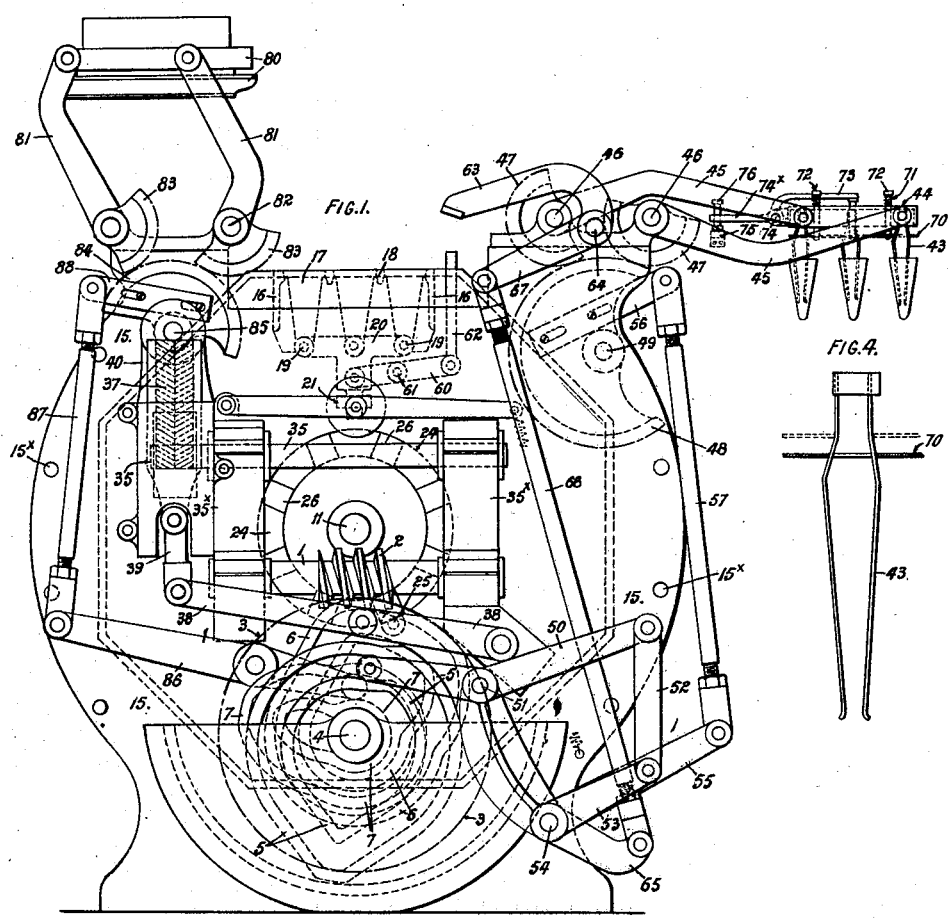

July 1, 1930.  J. H. BATES  1,769,661
MACHINE FOR MAKING CUP WAFERS, WAFER BISCUITS, AND THE LIKE
Filed Jan. 21, 1927    5 Sheets-Sheet 1

INVENTOR
J. H. BATES
BY
ATTY.

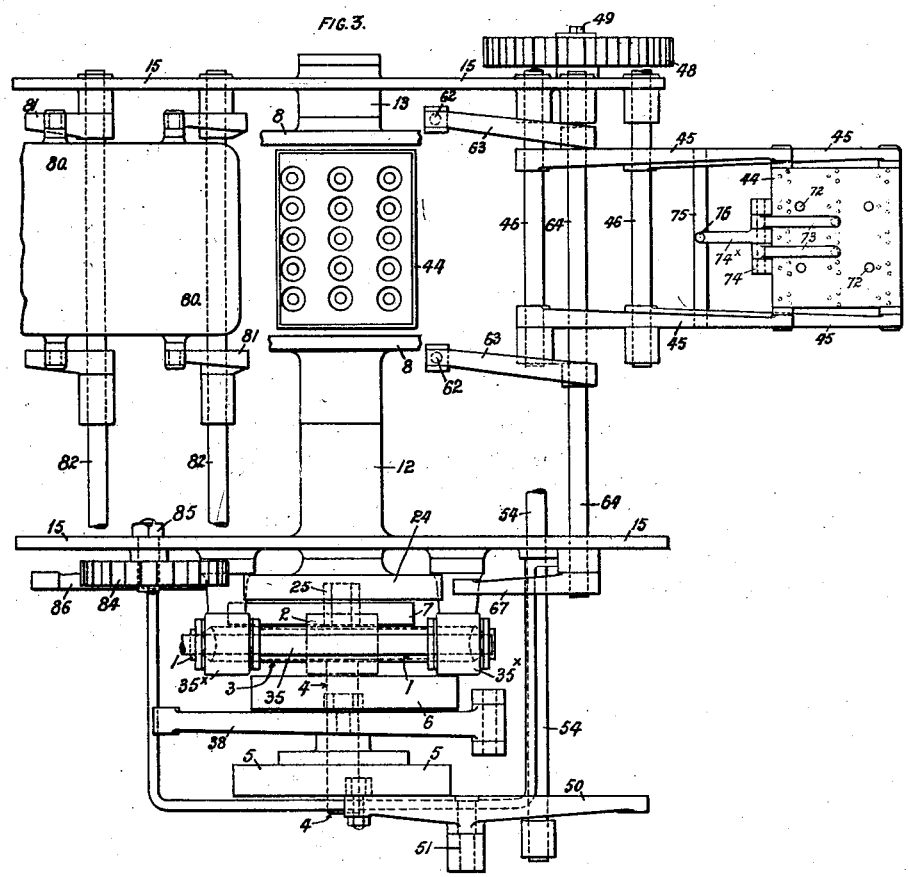

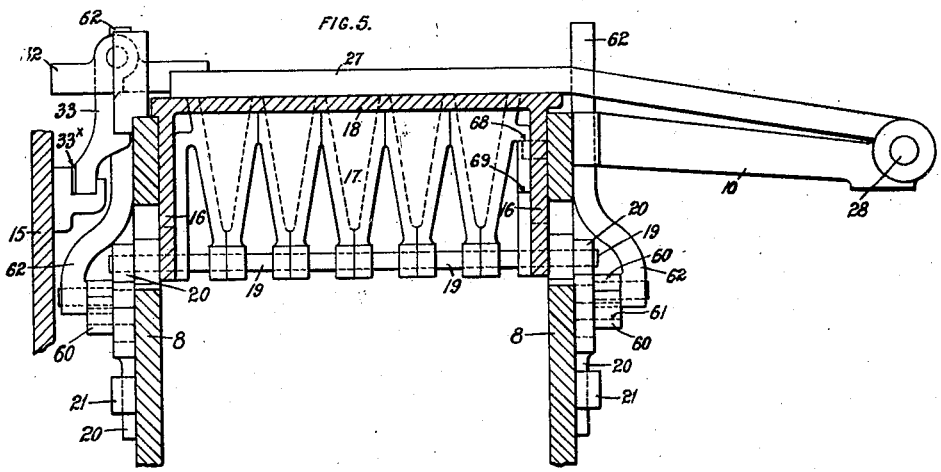
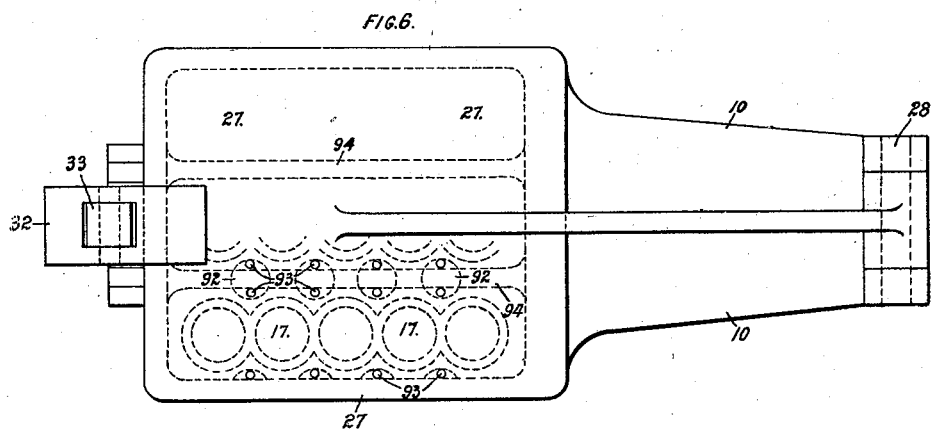

July 1, 1930.  J. H. BATES  1,769,661
MACHINE FOR MAKING CUP WAFERS, WAFER BISCUITS, AND THE LIKE
Filed Jan. 21, 1927    5 Sheets-Sheet 5
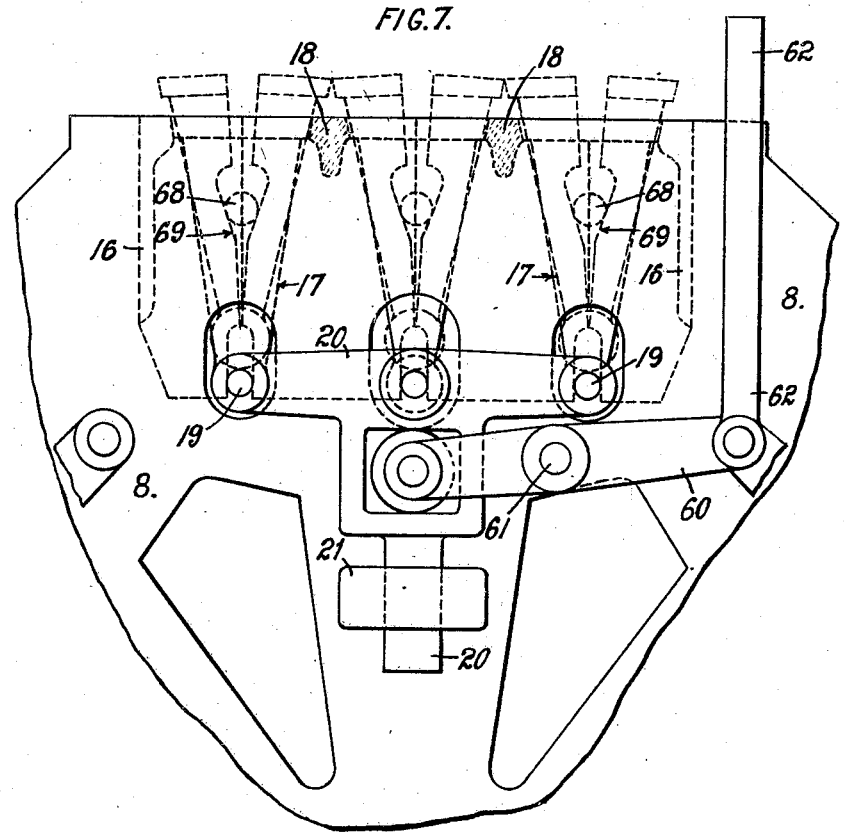
INVENTOR
J. H. BATES
BY Jno Lurie
ATTY.

Patented July 1, 1930

1,769,661

UNITED STATES PATENT OFFICE

JOSEPH HENRY BATES, OF ANFIELD, ENGLAND

MACHINE FOR MAKING CUP WAFERS, WAFER BISCUITS, AND THE LIKE

Application filed January 21, 1927, Serial No. 162,636, and in France January 22, 1926.

This invention has reference to machinery for making cup wafers of various shapes, wafer biscuits, and the like, of the kind in which a rotary part containing a plurality of sets of cooking moulds or plates are mounted on a revolving body or part, and are adapted to be rotated intermittently, and when the moulds or plates are opened, and a cooked batch of cup wafers, cones, or the like is removed from same, better or like liquid, from which these articles are made, is supplied automatically to the moulds or plates, and they are recharged, and the moulds or plates are closed, and then subjected to heat, until the return again to the discharging and charging position.

In this machine the cooked cup wafers or articles are removed from the moulds or plates when the plate is opened, automatically, and delivered to a position of reception to one side or end of the machine, and the articles are released automatically upon the opening of each mould or plate in succession, these parts are similarly moved back over the moulds or plates, and the operation described is repeated.

For convenience of description, the invention will be described as applied to a machine for making cup wafers, that is wafer biscuits of conical or cup form adapted to receive ices, confections, or the like.

In this machine, the cooked article removing devices referred to are so arranged or formed that they can be moved down into the interior of the cooked cups or cones, and engage the interior of same; and then they are moved upwards, and lift the articles out of the moulds, and move them over into the position of reception, when they are adapted to release them. Furthermore, the cups or cones are freed from the moulds by the moulds being in parts, and adapted to be automatically opened; that is different parts are movable in relation to each other, so that when they are so moved, say from pivot or point below, the mould parts will move away from another, and from the exterior surface of the cooked cup or cone, thus freeing it.

The extracting parts above described are mounted in a carrier which is supported and operated by a parallel lever or arm arrangement.

The cups or cones are made in batches or a plurality in each of the plates or moulds, but they are disconnected from one another, and may be provided at their upper edges with a short lip or flange. Being so made separate they do not require separating or stripping as usual.

The above describes generally the nature or character of the invention, and it will be further described in connection with the accompanying drawings, which show a machine constructed and adapted to operate in the manner above set forth.

Figure 2:
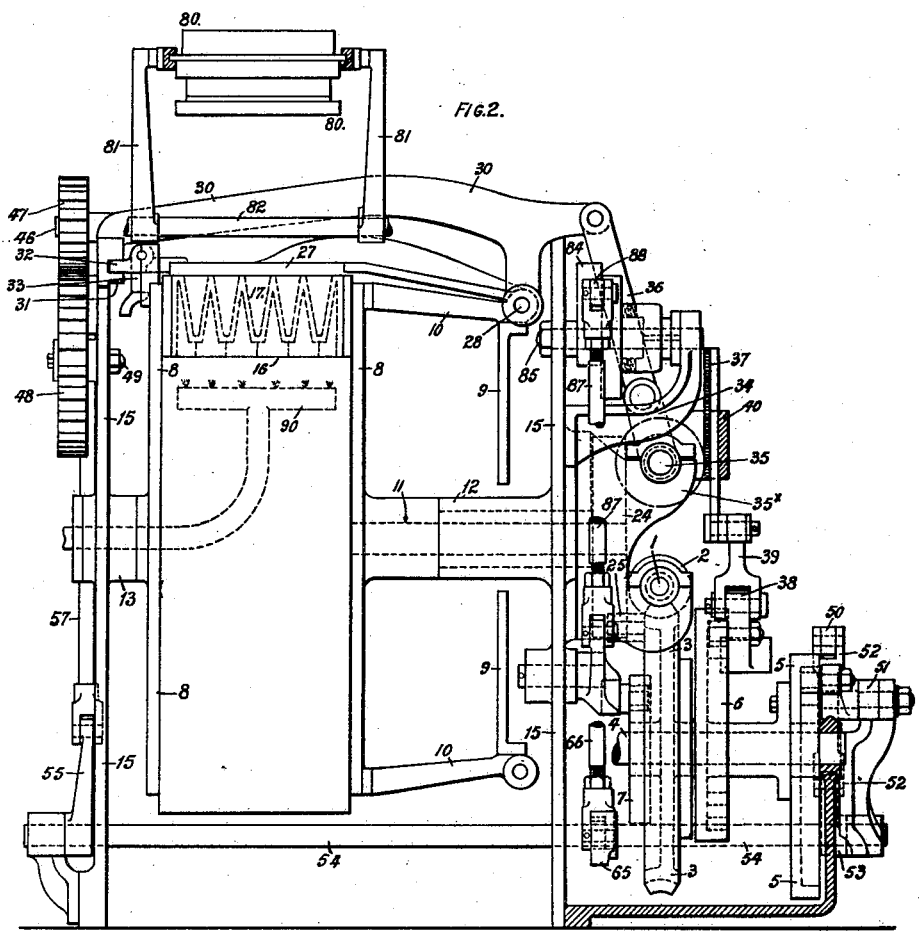

In these drawings, Figure 1 is a side elevation of the machine; Figure 2 is a cross section of same; Figure 3 is a plan, Figure 4 is a detail of the cup or cone removing device.

Figures 5, 6 and 7 are side elevation, plan, and end view of the plates or moulds, and the parts immediately connected therewith.

The machine is adapted to be worked by power, and 1 is the primary shaft by which power is transmitted to the machine.

This power is transmitted to the mechanism of the machine through a worm 2, and a worm wheel 3 on the shaft 4, on which are also fixed cams 5, 6 and 7, which through levers or the like, transmit motion to the various parts or mechanisms of the machine; namely, the batter or like liquid feeding apparatus, the cup or cone extracting and removing mechanism, and the plate opening and closing mechanism.

The rotary mould carrier frame consists of two plates or discs 8 between and to the inner faces of which the moulds are fixed, parallel with which is a baffle plate 9 carried from one of the plates 8 by bracket 10, to which the flanges of this plate 9 are fixed. These brackets also serve as the pivot carriers of the top movable plates of the moulds.

The discs or plates 8 are mounted on a shaft 11 at one side, which is supported in a bearing 12; and the other plate 8 supported in a bearing 13, and such bearings 12 and 13 are formed on the main stationary frame plates 15 of the machine, which extend down to the bottom, and are coupled together by rods 15×, and they may be fixed on a base if required.

The moulds or cooking devices in which the material is baked are marked 17 and are carried in a box 16, which is fixed at its sides to the two plates 8 which carry the moulds, and the upper parts or edges of the moulds are tapered, and normally fit and rest in tapered recesses in the top plate 18 of the mould box 16; and all these separate moulds are carried at their lower ends by cross bars 19, which are supported by a frame of T form marked 20, the lower portion of which is moved up and down in a bracket 21 as hereinafter explained.

The whole frame 8 with the attached and carried mould boxes, and parts connected with them for operating the moulds proper, is revolved step by step—in the case shown one eighth of a revolution—by means of a disc 24 fixed on the shaft 11, and operated from the worm wheel 3 by a roller on same, marked 25, which as it comes round by the rotation of the wheel 3, engages with one of the notches 26 in the face of the disc 24, and so moves it a portion of a circle, namely, ⅛th. After the disc and frame 8 are so moved, the roller leaves the notch or recess 26, one of the moulds or plates being then in the uppermost horizontal position, in which it will be opened as hereinafter described, and the contents removed.

When in this position, the first operation is to remove the upper or cover plate 27 of the mould, which is hinged to the brackets 10 by the hinges 28; and this is effected by a lever 30 pivoted on the hinge 28, and having a depending grooved end 31, into the groove of which a fitting 32 on the cover 27 of the mould enters, when it arrives in this position, so that when the opening lever 30 is rocked on its supporting pivot 28 by means as hereinafter described, the cover 27 will be lifted up about its hinge 28, so as to completely uncover the moulds proper; the top plate 27 having previously been unlocked by a part of its locking latch 33 having come into the cam groove 33× as usual in this type of machine.

The lever 30 is operated by a crank 34 fixed on a spindle 35 carried in the brackets 35× fixed on the frame 15, the crank operating the lever through a link 36; while the crank shaft 35 is operated by a rack 37, engaging with a toothed pinion on 35, and which is operated from the grooved face cam 6 on the shaft 4, this cam operating on a lever 38, and a link 39 connecting 38 with 37. The rack 37 is guided and works up and down in a guide bracket 40, fixed on the outside of the frame 15.

When in this position the cup wafers or cones are removed, by a number of 3 spring prong or finger devices 43, fixed in a plate 44, which is carried by two arms or levers 45, fixed on two rocking axles or shafts 46, carried on the upper part of the frame, and worked by two toothed quadrants 47 fixed on these shafts. These quadrants are operated by a common corresponding toothed quadrant 48 fixed on a shaft 49 which is rocked circularly to and fro by the cam 5 through a lever 50 pivoted at 51, a link 52, and an arm 53 fixed on the spindle 54, on which also is fixed an arm or lever 55 connected with an adjustable crank arm 56 on the face of the quadrant 48, and connected with same by the connecting rod 57. Thus, as the lever 50 is worked by the cam 5, so will the carrier plate 44 and fingers 43 in the first portion of their action, be moved over and into the cones in the moulds, and their hook ends made to engage the inner surface of the cones, they being slightly compressed by pressing them downwardly into the cones; and after this, the moulds themselves which are split or in halves, are opened, so as to liberate the cones, and thereupon the reverse action of the finger carrier plate 44 takes place, and it is moved upwards and over into the position shown in full lines in Figure 3, when the cones are subsequently released from the fingers as hereinafter described.

Regarding the operation of opening the mould cones 17, they are as shown, made in halves, all the halves on each side of the row of moulds being in one, and the two sets of halves are carried on a hinge rod 19, and they are all lifted together in their box 16 through T-shaped carriers 20, by means of a lever 60 hinged at 61, and connected to the lower part of the carrier 20, and its other end to a bar 62 (one of which is carried in each of the moulds) the end of which normally projects above the top of the mould as shown, and passing through the cover 27. When the mould is open, this bar or rod 62 is depressed, and thereby the moulds are raised and open the moulds; the depression being effected by a lever 63 mounted on the shaft 64, and operated from the rocking shaft 54 by an arm 65 fixed thereon, through a connecting rod 66, and an arm 67 fixed on the shaft 64, on which the arm 63 is fixed; so that, as this arm 57 is moved up and down, the lever or arm 63 is moved up and down and actuates the bar or rod 62.

To cause the two halves of each mould 17 to move away from each other in the freeing action above described, a pin 68 is fixed on the inside of the mould box or carrier 16 and works in connection with each row of moulds; and it projects into a wedge shaped opening 69 in the side of the mould adjacent to it, so that when the moulds are moved up as described, the pin will press on the inclined sides of this gap, and so press the two halves apart, in which action also the upper inclined faces or edges of the moulds will be lifted up out of their inclined circular seats in the top plate 18 of the mould box, as shown in dotted lines in Figure 7.

Regarding the releasing of the cones or cups from the fingers after they have been removed from the mould, a thin releasing plate 70 is employed through holes in which the inclined upper parts of the fingers 43 pass, so that if this plate is pressed down, the edges round the holes in same press on the inclined parts of the fingers, press them together, and so remove their lower engaging tips or hooks from the interior of the cones, and so free them; and this action is effected by pins 72 on the plate 70, which are carried up through the plate 44, and are acted on by levers 73 fixed on the pivot pin 74, carried by the plate 44, and having fixed on it a lever 74×, which is actuated by a cross bar 75 carried by the lower lever 45, this bar acting at its centre on a screw pin 76 in the end of the lever 74×. Thus when the lever 74× is lifted, the levers 73 press the plate 70 down, so that the fingers release the cones or cups.

The lifting of the plate 70, after its depression, is effected through springs 71 surrounding the headed pins 72, which are fixed to the plate 70, and pass through the plate 44. Thus when the plate 44 is free, the springs 71 press the pins and the plate 70 up, and so allow the fingers to expand.

After the cones or wafer biscuits have been removed from the moulds, and the latter lowered by the elevation of the lever or arm 63, the moulds are recharged with the required quantities of batter or liquid; and this is effected by an automatic supply apparatus generally marked 80, which in itself is of known kind, and which when moved over the moulds will automatically deliver the required quantities of liquid into all the several moulds, the quantity being a pre-determined one.

The charging apparatus 80 is carried by pivoted carrier arms 81, fixed on the rocking pivot shafts 82, carried by bearings on the upper part of the frame. On the shafts 82 are fixed toothed quadrants 83, which mesh with a common toothed quadrant 84 fixed on the shaft 85, fixed on the frame 15; this latter quadrant being worked from the cam 7 through a lever 86, and a connecting rod 87, which is fixed to a crank arm 88 adjustably fixed on the quadrant 84.

After the moulds have received the required quantity of batter, the cam 7 will then operate the arms 81, and lift them, and so lift the automatic supply apparatus 80 into its upper position as shown in the drawing; and thereupon the cover 27 is moved down over the top of and closes the moulds by means of the lever 30, and the catch 33 will then fall under the engaging projection of the mould box, which it is free to do by gravity, being hinged from the engaging part 32; and then the whole mould frame is rotated one eight of a revolution by means of the disc 24, and its operating cam and gear, whereby another mould or plate is brought into the upper position, and the operations are repeated.

The interior of the mould frame is supplied with a burner or burners 90, the gas supply of which passes through a hollow journal of the bearing 13 which supports the frame 8, so that the moulds are always open to and being acted upon by the heat within this chamber, the escape of heat from which can take place through suitable holes in the plates or frames 8.

Vent holes are provided in the top plate 27, so as to permit of the vapour or steam driven off in the cooking of the material, to be released and pass away.

All the half moulds of a row of moulds are in one casting, and the outer edges are scalloped; and the top plate of the mould box is correspondingly formed, as shown; and in the top plate there are holes 92 which will come under the vent holes 93 in the cover 27; and between the sides of the box 16, ribs 94 extend from side to side so as to form several elongated spaces in this box, within which the moulds proper 17 are disposed.

What is claimed is:—

1. In a machine for making hollow wafer articles, the combination of a mold having a plurality of chambers adapted to receive charges of batter to be cooked, spring devices in the form of spring fingers adapted to engage inside of the cooked articles, said fingers above the articles being upwardly convergent, a supporting means for said engaging devices adapted to vibrate and to move the engaging devices from the engaging position over the mold to a place of delivery beyond the same, and a plate movable longitudinally of the spring fingers and designed in movement toward the engaging ends of the fingers to cooperate with the upwardly convergent portions of the fingers to force the engaging ends of the fingers toward each other to a degree to release the engagement of said fingers with the article.

2. In a machine for making wafer articles, the combination with the frames thereof, of a batter carrier adapted to contain and deliver a plurality of charges of batter, arms pivoted on the frames and to the batter carrier, toothed quadrants on the supporting pivots of the arms, a pivoted toothed wheel common to both quadrants and meshing therewith, a mould having a plurality of mould chambers, a plurality of article removing devices, a carrier carrying said devices, arms or levers pivoted to said devices, and to the frames, toothed quadrants on said latter pivots, and a toothed wheel common to both quadrants, and engaging therewith.

In testimony whereof I have signed my name to this specification.

JOSEPH H. BATES.